United States Patent [19]

Miyoshi et al.

[11] Patent Number: 5,497,473
[45] Date of Patent: Mar. 5, 1996

[54] CONTROL CIRCUIT FOR CONTROLLING A CACHE MEMORY DIVIDED INTO A PLURALITY OF BANKS

[75] Inventors: Akira Miyoshi; Shirou Yoshioka, both of Osaka, Japan

[73] Assignee: Matsushita Electric Industrial Co., Ltd., Osaka, Japan

[21] Appl. No.: 90,931

[22] Filed: Jul. 14, 1993

[30] Foreign Application Priority Data

Jul. 14, 1992 [JP] Japan ..................... 4-186489

[51] Int. Cl.$^6$ ..................... G06F 12/02
[52] U.S. Cl. ..................... 395/427; 395/405; 364/DIG. 1; 365/189.04; 365/230.03
[58] Field of Search ..................... 364/200 MS File, 364/900 MS File; 395/400, 425; 365/189.04, 189.05, 189.07, 230.03, 230.08

[56] References Cited

U.S. PATENT DOCUMENTS

| 5,067,078 | 11/1991 | Talgam et al. | 395/400 |
| 5,249,282 | 9/1993 | Segers | 395/425 |
| 5,353,424 | 10/1994 | Partovi et al. | 395/425 |

FOREIGN PATENT DOCUMENTS

| 2-90345 | 3/1990 | Japan. |
| 2-156351 | 6/1990 | Japan. |
| 3-257554 | 11/1991 | Japan. |

Primary Examiner—Rebecca L. Rudolph
Assistant Examiner—Hiep T. Nguyen
Attorney, Agent, or Firm—Willian Brinks Hofer Gilson & Lione

[57] ABSTRACT

A signal cache memory controller which includes line for inputting an index section of an address is formed with a branch line which is intervened by an address delay circuit. In each of banks X and Y, a switching circuit selects the data which has been delayed in response to a select signal Sse being outputted as a cache-access address to be outputted to a tag memory. An address comparator compares a tag section of the address input through a signal line for inputting the tag section with a reference address output from the tag memory and outputs an coincidence signal if there is a coincidence therebetween. When the coincidence signal is generated and the select signal Sse is not generated, a bank-hit signal generating circuit generated a bank-hit signal Sbh, in response to which a select-signal generating circuit generates the select signal Sse. The circuit for controlling a cache memory which is divided into a plurality of banks enables the writing of data in the cache in every cycle.

7 Claims, 8 Drawing Sheets

CONTROL CIRCUIT FOR CONTROLLING A CACHE MEMORY DIVIDED INTO A PLURALITY OF BANKS

BACKGROUND OF THE INVENTION

The present invention relates to a circuit for controlling a cache memory which is placed between a processor and a main memory, and particularly to a circuit for controlling a cache memory which is divided into a plurality of banks.

As disclosed in Japanese Laid-open Patent Publication No.3-257554, it has been a well-known technique to add a cache memory 3 to an electronic calculator or microprocessor along with a central processing unit 1 and a main memory 2, as shown in FIG. 8. The cache memory 3 is internally provided with a data memory 3a, tag memory 3b and hit detector 3c, so as to increase the processing speed by detecting and storing the most frequently accessed data in it.

Another well-known technique is a memory system disclosed in Japanese Laid-open Patent Publication No.2-90345, in which a bank register for storing expanded address information, which is needed to expand address space, is provided along with a cache memory so that the system uses both the main memory with bank function and the cache memory.

The performance of a microprocessor or the like with such a cache memory has been remarkably improved in recent years, and the capacity of the cache memory provided therein years, and the capacity of the cache memory provided therein has been increasing. The increase in cache capacity has been accompanied by the improvement of hit rate, so that the lowering of system performance due to external-bus access penalty has been drastically reduced. Instead, the lowering of system performance due to cache access penalty is causing problems.

Below, an embodiment of the control circuit for a cache memory which is divided into a plurality of banks so as to form so-called bank structure will be described with reference to the drawings.

FIG. 6 shows the structure of a conventional control circuit for a cache memory. An address signal ADD to be inputted is composed of a 7-bit index section ADDi and a 24-bit tag section ADDt. The cache memory is divided into two banks X and Y. The bank X is provided with a tag memory 11x and data memory 12x and the bank Y is provided with a tag memory 11y and data memory 12y. The banks X and Y are also provided with address comparators 13x and 13y, respectively, for comparing the index section ADDi of the address signal ADD with a reference address Mt from the tag memory 11x and for outputting an coincidence signal Sco when there is a coincidence between the two.

A clock is composed of a first-phase clock ph1 and second-phase ph2. The first-phase and second-phase clocks ph1 and ph2 have the same period and repeats the same cycle of Hi and Low, but compared to the cycle of the first-phase clock, the cycle of the second-phase clock is delayed by half the period. That is, each of the two clocks has the nega- tive-phase sequence with respect to the other. In the control circuit are provided a first-phase latch circuit L1h and second-phase latch circuit L2h which synchronize the signal with the first-phase clock ph1 and second-phase clock ph2, respectively. A write-access-hit-signal generating circuit 45 outputs, as a write-access-hit signal Swah, the logical product of a write-mode signal Swin for selectively instructing the writing or reading of data and a write instruction signal Swr, which will be described below. An enable-signal generating circuit 44 outputs, as an enable signal Sen, the logical product of the inverted write-access-hit signal Swah, which has been synchronized with the second-phase clock ph2 by the second-phase latch circuit L2, and the clock signal ph1. An address latch circuit 43 latches the index section ADDi of the address signal ADD and outputs it as a cache-access address ADDac.

On the output side of the above-mentioned banks X and Y is placed a hit-signal generating circuit 48 for outputting, as a hit signal Shit, the logical sum of the output Sco from the address comparator 13x, and the output Sco from the address comparator 13y, and a logical product calculator 49 for outputting, as the write instruction signal Swr, the logical product of the output Shit from the hit-signal generating circuit 48 and the inverted write-access-hit signal Swah mentioned above.

Each of the tag memories 11x and 11y is accessed by the cache-access address ADDac, so as to output the reference address Mt. Each of the data memories 12x and 12y is accessed by the cache-access address ADDac, so as to output read data.

The operation of the control circuit for a cache memory with the foregoing structure will be described below by using the timing chart in FIG. 7. Considering the delay time at the gate and the like, the waveforms of respective signals in FIG. 7 are drawn in deviation from the clocks ph1 and ph2. FIG. 7 shows the operations of the major signals when a hit that occurred in writing in the first bank X is sequentially followed by a read request, resulting in a hit in the second bank Y. It is observed from the drawing that the first-phase clock ph1 is Hi during the clock-cycle segments 1a, 2a, 3a, and 4a, while the second-phase clock ph2 is Hi during the clock-cycle segments 1b, 2b, 3b, and 4b. DATA is outputted from or inputted to the data memories 12x and 12y. FIG. 7 shows in descending order the states of the clocks ph1 and ph2, DATA, write-mode signal Swin (Hi indicates the write mode and Low indicates the read mode), write-access hit signal Swah, index section ADDi and tag section ADDt of the input address signal, cache-access address ADDac, and hit signal Shit.

First, the index section (Ai) of an address (A) is inputted as the input index section ADDi in the clock-cycle segment 1a, so as to be outputted as the cache access address ADDac in the clock-cycle segment 1b. Then, the reference address Mt is outputted from the tag memories 11x and 11y in response to the address (A), so as to be compared with the tag section (At) of the address (A) by the address comparators 13x and 13y. If both signals coincide as a result of comparison in the first bank X, the coincidence signal Sco is outputted in the clock-cycle segment 2a. With the coincidence signal Sco being outputted, the hit signal Shit is outputted and the write instruction signal Swr is outputted. Since the write-mode signal Swin is Hi during the clock-cycle segment 2a, the write-access hit signal Swah becomes Hi in the clock-cycle segment 2a, the address (A) is held as the cache-access address ADDac during the clock-cycle segments 2b and 3a, and the data is written in the data memory 12x during the clock-cycle segment 3a.

Subsequently, the write-access hit signal Swah becomes Low in the clock-cycle segment 3a. When the index section (Bi) of an address (B) is outputted as the cache-access address ADDac in the clock-cycle segment 3a, the reference address Mt is outputted from the tag memories 11x and 11y in of response, so as to be compared with the tag section (Bt) the address (B). If both signals coincide as a result of comparison in the second bank Y, the coincidence signal Sco is outputted in the clock-cycle segment 4a, so as to output the hit signal Shit. However, the structure described above is disadvantageous in that two cycles are required to carry out the writing of data in the cache memory, for the presence or absence of a cache hit is determined in the first cycle and then data is written in the cache memory in the second cycle.

There is still another technique as disclosed in Japanese Laid-open Patent No.2-156351, in which the data memory is placed between the central processing unit and main memory of an electronic calculator so that the address in the main memory of the data, which has been stored in the data memory, is stored in the tag memory. When processor address data is outputted from the central processing unit, address data, which was outputted from the tag memory in response to the processor address memory, is compared with the processor address memory to determine whether there was a hit or miss. By further providing a circuit for converting the address and a circuit for switching the address so that the processor address data is fetched to be outputted in reading data and that the processor address data is delayed by specified cycles in writing data, the reading of data is carried out simultaneously with the writing of data. However, since the conversion of the address number requires other subsequent procedures, the processing speed is not increased.

The object of the present invention, which was conducted in order to solve the above-mentioned problems, is to constitute a circuit for controlling a cache memory which enables the writing of data in consecutive cycles so as to increase the processing speed.

SUMMARY OF THE INVENTION

In the circuit for controlling a cache memory according to the present invention, a cache memory is separately provided from a main memory and is divided into a plurality of banks, each bank having a tag memory and data memory. Said tag memory is constituted so as to output a reference address in response to an access signal. In addition, said circuit for controlling a cache memory comprises: a means for generating an address signal composed of an index section and tag section in each of said banks via a signal line for inputting the tag section and a signal line for inputting the index section; a branch line for inputting the index section which is branched from said signal line for inputting the index section; an address delay means intervening in said branch line for inputting the index section so as to delay the output of the index section of the address signal; a signal switching means having the output connected to said tag memory and data memory and the input connected to the output of said signal line for inputting the index section and to the output of the address delay means intervening in the branch line for inputting the index section, said signal switching means being constituted so as to switch output data between data which is inputted via the signal line for inputting the index section and delayed data which is inputted via the branch line for inputting the index section; an address comparing means which is provided in each of said banks and which has the input terminal connected to said signal line for inputting the tag portion and to the output signal line of said tag memory, so as to compare the tag section of said address signal with the reference address output from said tag memory and to output an coincidence signal when there is a coincidence between the two; a writing-operation control means which fetches, when the coincidence signal is outputted from one of said banks, a memory corresponding to said address from the main memory and controls the writing of data in the data memory of the bank in which said coincidence signal was outputted; and a means for selectively controlling operations which controls said switching means so that, when the coincidence signal is outputted from said address comparing means in view of the results of comparison which was made by the address comparing means for writing, the delayed data of the index section of the address signal which is generated by said means for generating the address signal is selected as the access signal for the next comparison to be outputted to said memory tag.

With the structure described above, the control circuit for a cache memory according to the present invention operates as follows. In a bank, the address comparing means compares the tag section of the input address and the reference address from the tag memory. If there is a coincidence between the two, the coincidence signal is outputted. When the address signal for the next comparison is inputted in the bank, the delayed index section of the previous address signal is selected as the access signal by the means for selectively controlling operations. Consequently, if the coincidence signal was outputted in a comparing operation in a bank, the coincidence signal will not be outputted in the next comparing operation in the same bank. Meanwhile, data is written in the data memory by the writing-operation control means. In the banks other than the one mentioned above, however, the index section of the address signal for the next comparison is outputted by the means for selectively controlling operations to the tag memory without being delayed, so that the address signal input by the address comparing means is compared with the reference address output from the tag memory while the writing of data is conducted in the bank in which the coincidence signal was outputted by the previous comparison. If there is a coincidence between them, a coincidence signal is outputted in the bank and the data is written in the data memory by the writing-operation control means. Consequently, when an address corresponding to different banks is sequentially inputted, it is possible, while a writing operation is performed in a bank, to sequentially carry out the writing of data in another bank without waiting.

It is also possible to add following elements to the foregoing structure. There can be provided: a select-signal generating means which has the input being connected to the output of said bank-hit signal generating means so that the select signal is outputted in response to the bank-hit signal; and a bank-hit signal generating means which has the input being connected to the output of said means for comparing the address signal and to the output of said select-signal generating means, so as to generate a bank-hit signal in response to said coincidence signal when said select signal is not outputted. Said means for selectively controlling operations controls the signal switching means so that, in response to the select signal from said select-signal generating means, the delayed data of the index section of the input address signal is selected.

Thus, the output of the next bank-hit signal is prevented while the previous bank-hit signal is outputted in a bank, so that the mis-operation of the writing operation control means will be avoided.

It is also possible to provide said address delay means with a single delay circuit which delays the index section of the address signal with a timing common to each of the banks.

Thus, the single delay circuit enables the smooth control by the means for selectively controlling operation in each of the banks, so that a simpler structure is obtained, resulting in cost reduction.

It is also possible to add to the foregoing structure: a reading-operation control means which instructs the reading of data from said data memory when there is a corresponding address in response to the access signal; and an operation-mode switching means which has the output for switching between a write mode in which the writing-operation control means operates and a read mode in which the reading-operation control means operates, said output being connected to the input of said select-signal generating means. Thus, the writing and reading of data in and from the cache memory can smoothly be performed.

DETAILED DESCRIPTION OF THE PREFERRED EMBODIMENT

Examples of the present invention will be described below.

EXAMPLE 1

Figure 1:
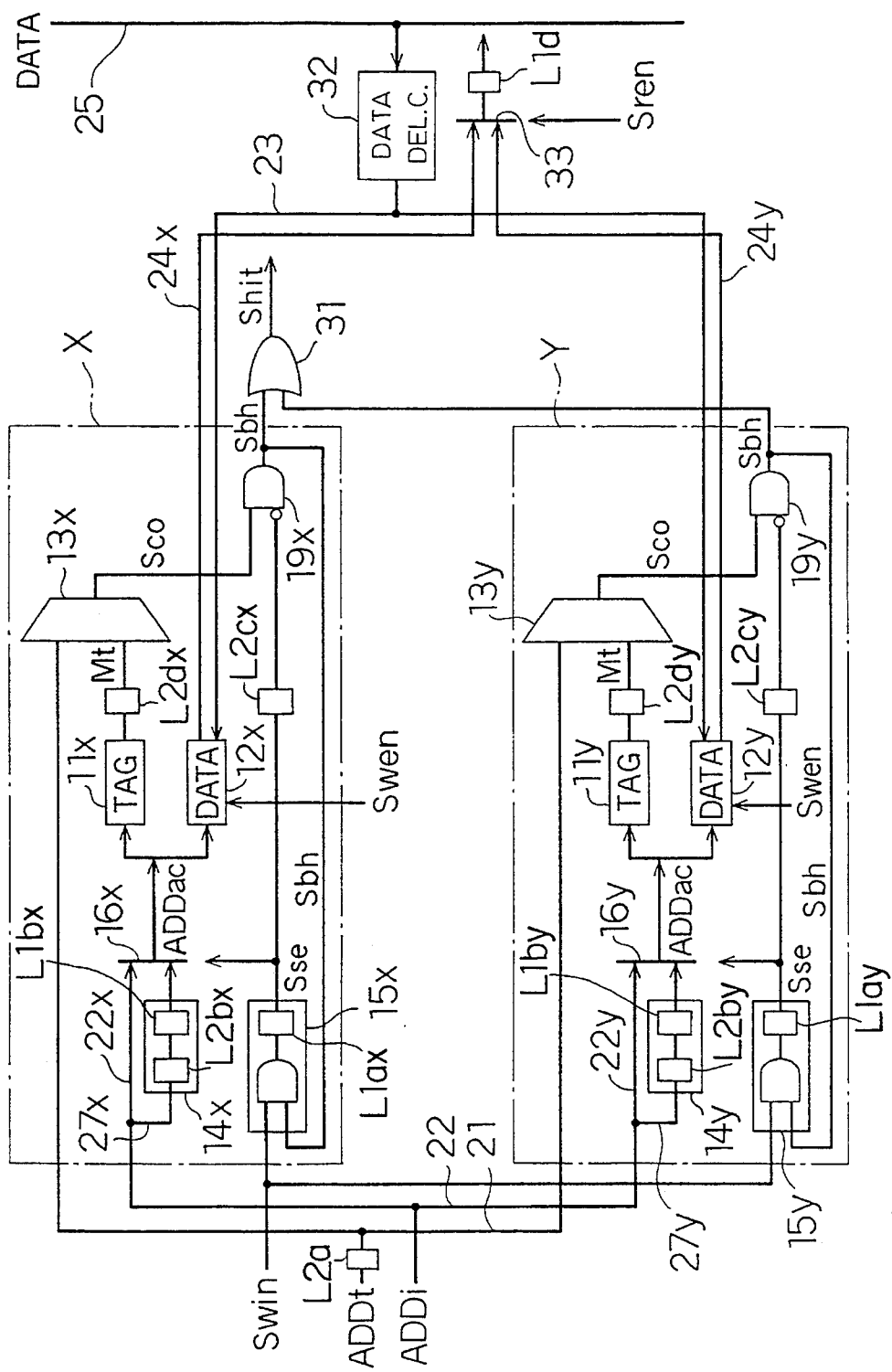
FIG. 1 is an electric circuit diagram for controlling a cache memory in the first embodiment.
Figure 8:
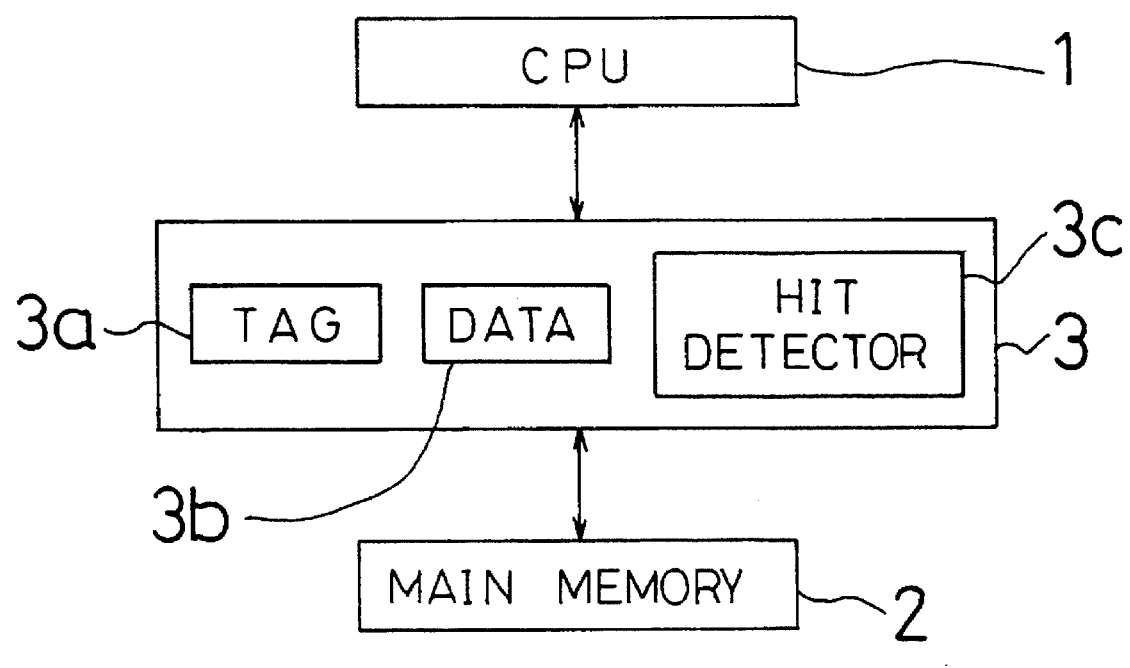
FIG. 8 is a block diagram of a microprocessor.

The first example will be described below. FIG. 1 is a view showing the structure of the control circuit for a cache memory in the first embodiment. The overall structure of the device is not shown here, for it is substantially the same as the structure of the conventional device shown in FIG. 8. However, the tag memory and data memory according to the present invention are divided into a plurality of banks.

FIG. 1 shows a cache memory which is divided into first and second banks X and Y. The banks X and Y are provided with tag memories 11x and 11y for outputting a reference address Mt by using a cache-access address ADDac, which will be described below, and with data memories 12x and 12y for reading and writing data by using the cache-access address ADDac, respectively. The banks X and Y are also provided with address comparators 13x and 13y, respectively, which compares the tag section ADDt of the address signal ADD with the reference address Mt from the tag memory 11x and outputs the coincidence signal Sco when there is a coincidence between the two.

A clock is composed of a first-phase clock ph1 and a second-phase clock ph2. The first-phase and second-phase clocks ph1 and ph2 have the same period and repeats the same cycle of Hi and Low, but compared to the cycle of the first-phase clock, the cycle of the second-phase clock is delayed by half the period. As will be described below, latch circuits L1bx and L1by and L2bx and L2by for synchronizing the signal with the first-phase clock ph1 and the second-phase clock ph2 are appropriately provided in the control circuit.

The address signal ADD generated by an address-signal generating means (not shown) on the processor side is composed of the 7-bit index section ADDi and 24-bit tag section ADDt, which are separately inputted through a signal line 22 for inputting the index section and through a signal line 21 for inputting the tag section, so that the index section ADDi is synchronized with the first-phase clock ph1 while the tag section ADDt is synchronized with the second-phase clock ph2 by the second-phase latch circuit L2a. In the banks X and Y are provided branch lines 27x and 27y which branch from the foregoing lines 22x and 22y for inputting the index section, respectively. The branch lines 27x and 27y are intervened by address delay circuits 14x and 14y for delaying the output of the index section ADDi of the input address by one period of the clock cycle. The foregoing signal lines 22x and 22y for inputting the index section and their branch lines 27x and 27y are connected to the inputs of switching circuits 16x and 16y serving as signal switching means. The outputs of switching circuits 16x and 16y are connected to the inputs of the tag memories 11x and 11y and to the inputs of the data memories 12x and 12y.

In the banks X and Y are also provided select-signal generating circuits 15x and 15y. If there is a cache hit in writing in a clock-cycle segment, the select-signal generating circuits 15x and 15y generate a select signal Sse in the next clock-cycle segment. The inputs of the select-signal generating circuits 15x and 15y are connected to the signal lines for the write-mode signal Swin and to the output signal lines of a bank-hit-signal generating circuits 19x and 19y, which will be described below, so that the select signal Sse is outputted when the bank-hit signal Sbh is Hi and the write-mode signal Swin is Hi and that the select signal Sse is synchronized with the first-phase clock ph1 by the first-phase latch circuit L1ax and L1ay.

The terminals for inputting control signals of the foregoing switching circuits 16x and 16y are connected to the output signal lines of the foregoing select-signal generating circuits 15x and 15y, so that when selected signal Sse is a logic "1" (i.e., logical high), the index section ADDi of the address signal, which was delayed and inputted via the branch lines 27x and 27y for inputting the index section, is outputted as the cache-access address ADDac, and, when the selected signal Sse is a logic "∅" (i.e., logical low), the index section ADDi of the address signal, which was not delayed and inputted via the signal lines 22x and 22y for inputting the index section, is outputted as the cache-access address ADDac.

In the foregoing banks X and Y are still further provided the bank-hit-signal generating circuits 19x and 19y. The inputs of the bank-hit-signal generating circuits 19x and 19y are connected to the output signal lines of the foregoing address comparators 13x and 13y and to the output signal lines of the foregoing select signal generating circuits 15x and 15y, so as to generate the bank hit signal Sbh by calculating the logical product of the coincidence signal Sco which was outputted from the foregoing address comparator 13x or 13y and the inverted select signal Sse which has been synchronized with the second-phase clock ph2 by the second-phase latch circuit L2cx or L2cy. That is, the bank-hit-signal generating circuits 19x and 19y output the bank-hit signal Sbh when the select signal Sse latched by the second-phase latch circuit L2cx or L2cy is not outputted and the coincidence signal Sco is outputted.

On the other hand, the outputs of the bank-hit-signal generating circuits 19x and 19y in the banks X and Y are connected to the input of a hit-signal generating circuit 31. The hit signal Shit is outputted by calculating the logical sum of the bank-hit signals Sbh which were outputted from the foregoing bank-hit-signal generating circuits 19x and 19y, respectively. In other words, the hit signal Shit is outputted when the bank-hit signal Sbh is outputted in either of the banks.

A signal line 23 is provided to connect the data memories 12x and 12y in the banks X and Y to a signal line 25 which is connected to the main memory (not shown). The signal line 23 is provided with a data delay circuit 32. The data delay circuit 32 delays the supply of data, which was inputted from the main memory, to the data memories 12x and 12y. The data read from the data memories 12x and 12y of the banks X and Y are outputted through the signal lines 24x and 24y to the input of the data select circuit 33, so as to be selected there in response to a signal Sren for permitting the output of read data and then to be outputted to a data line 25. That is, the data on the data line 23 is written in the data memories 12x and 12y in response to a write enable signal Swen, or the data corresponding to the address where a hit occurred in the tag memories 11x and 11y are outputted from the data memories 12x and 12y to the data lines 24x and 24y.

Figure 2:
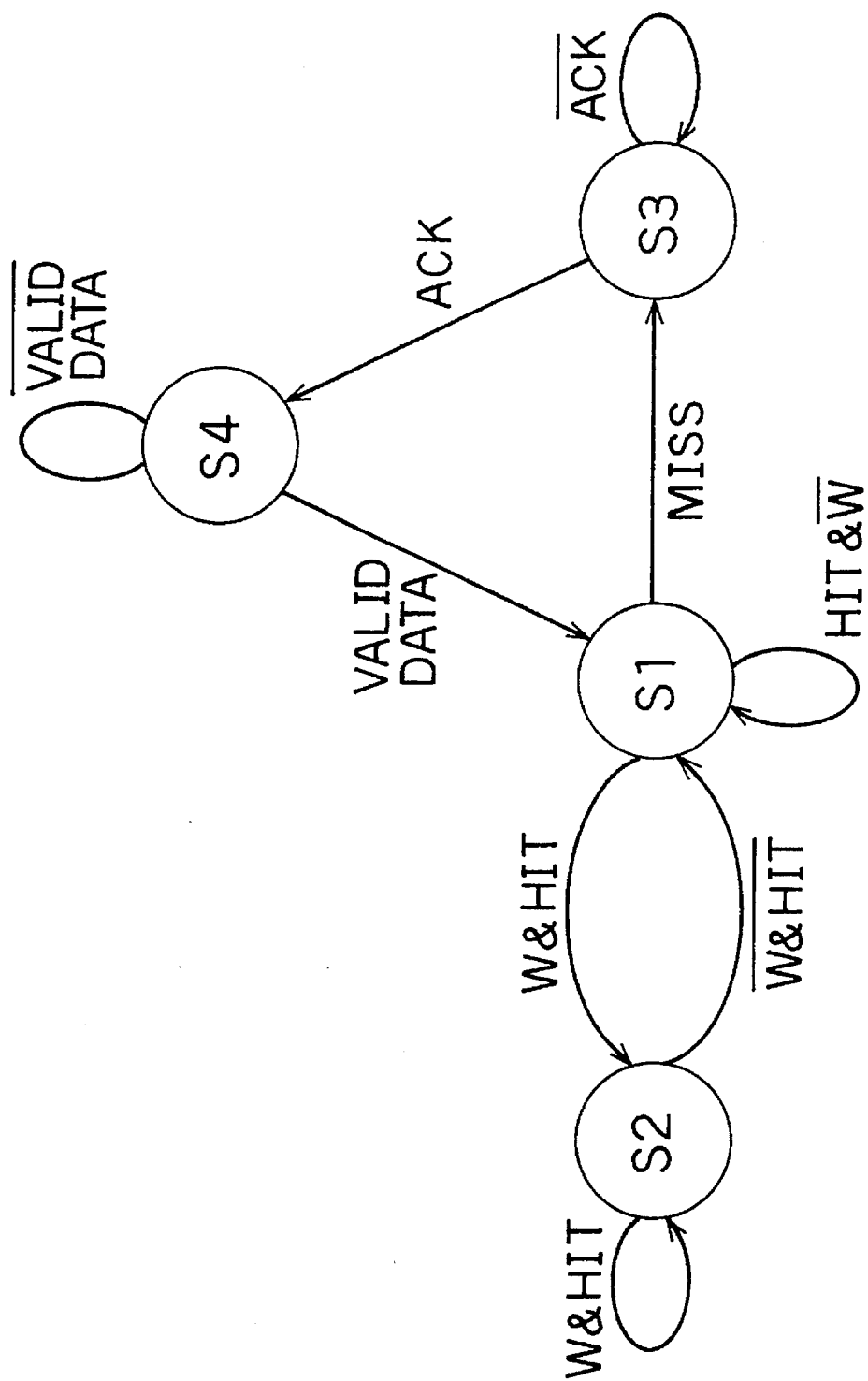
FIG. 2 is a view showing the transition in the state of the control circuit for a cache memory in the first embodiment.

FIG. 2 is a view showing the transition in the state of the control circuit for the cache memory in the embodiment of the present invention. Both first and second states S1 and S2 indicate a cache hit. In the first state S1, there is no bank in which data is being written in its data memory while in the second bank, there exists a bank in which data is being written in its data memory. If there occurs a cache hit in writing in the first state S1, a transition is made to the second state S2. If there occurs a cache hit in writing in the second state S2, the cache memory remains in the second state S2. Otherwise, a transition is made to the first state S1. In a third state S3, an acknowledge from a bus interface is being waited. In a fourth state, valid data back from the bus interface is being waited. If a cache miss occurs in the first state S1, a transition is made to the third state S3 to wait for an acknowledge from the bus interface there. If an acknowledge is returned, a transition is made to the fourth state S4 to wait for valid data to be returned. If valid data is returned, a transition is made to the first state S1.

Referring to FIGS. 1 to 4, the operation of the control circuit for a cache memory with the foregoing structure will be described.

Figure 3:
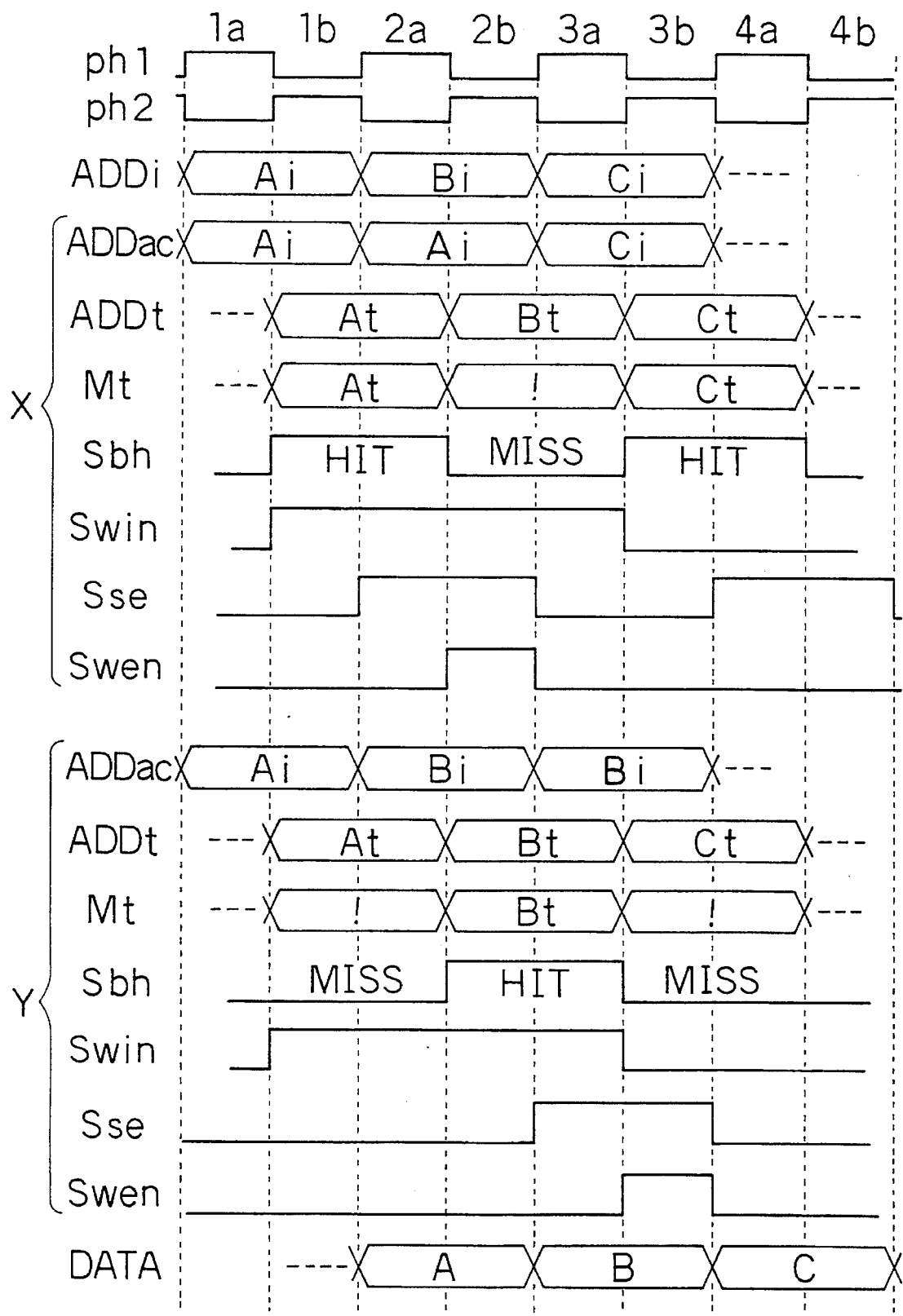
FIG. 3 is a timing chart for illustrating the operation in the first embodiment.
Figure 7:
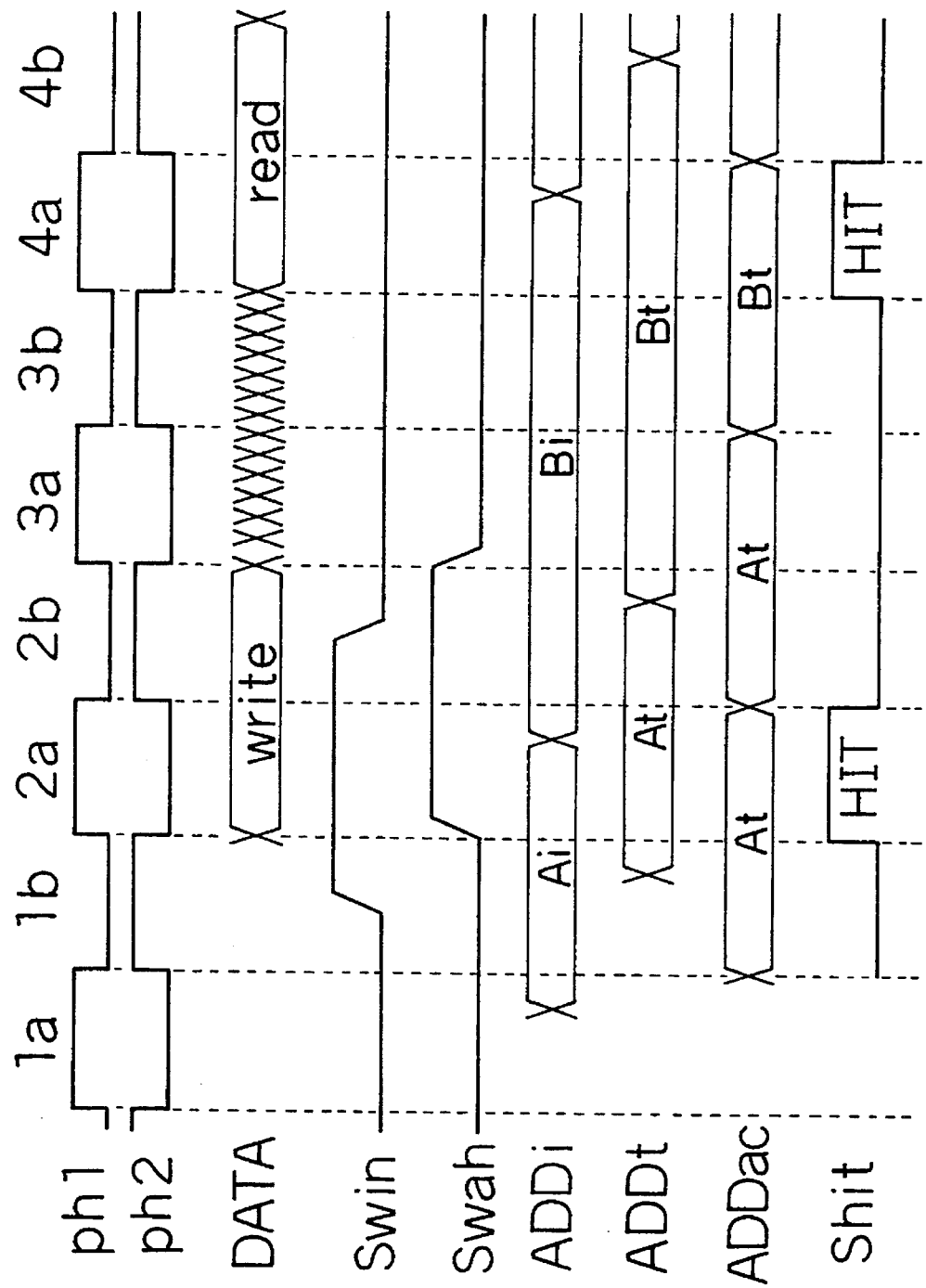
FIG. 7 is a timing chart for illustrating the operation in a prior art embodiment.

FIG. 3 is a view showing the operation of the major signals when a writing hit in the first bank X is sequentially followed by a writing request, resulting in a hit in the second bank Y, and finally a reading request is made to result in a hit in the first bank X. Although the waveforms of the signals in the timing chart of FIG. 7 are drawn in deviation from the clocks ph1 and ph2, in view of the delay time at the gate and the like as described above, the wave-forms of the signals in FIGS. 3 and 4 are drawn in synchronization with the clocks ph1 and ph2, for the delay time is ignored here.

In FIG. 3, the first-phase and second-phase clocks ph1 and ph2 have the same period and repeats the same cycle of Hi and Low, but compared to the cycle of the first-phase clock, the cycle of the second-phase clock is delayed by half the period. It is supposed for convenience that the first clock ph1 is Hi during the cycles 1a, 2a, 3a, and 4a and the second clock ph2 is Hi during the cycles 1b, 2b, 3b, and 4b. The drawing shows in descending order the changing states of the first clock ph1, second clock ph2, index section ADDi of the input address signal, cache-access address ADDac in the first and second banks X and Y, tag section ADDt of the input address signal, reference address Mt, bank-hit signal Sbh, write-mode signal Swin, select signal Sse, write enable signal Swen, and DATA on the signal line 25.

First, when the index section (Ai) of the address (A) is inputted in the clock-cycle segment 1a, it is outputted as the cache-access address ADDac in the respective banks X and Y in the clock-cycle segment 1a because the select signal Sse is not outputted in the switching circuits 16x and 16y, so that the tag memories 11x and 11y are accessed. The tag memories 11x and 11y output the reference address (At) in response to the index section (Ai) of the address (A), which is then latched by the second-phase latch circuit L2dx and L2dx. Meanwhile, the tag section (At) of the address (A) is also latched by the second-phase latch circuit L2a on the signal line 21, so as to be inputted to the banks X and Y via the signal line 21 in the clock-cycle segment 1b. The tag section (At) of the address (A) and the reference address (At) are compared by the address comparators 11x and 11y in the clock-cycle segment 1b, resulting in a hit in the first bank X so as to output the coincidence signal Sco. Accordingly, the bank-hit signal generating circuit 19x outputs the bank-hit signal Sbh in the clock-cycle segment 1b, followed by the output of the hit signal Shit from the hit-signal generating circuit 31. At that time, the cache memory is in the first state S1. In the second bank Y, the data in response to the address (A) is not outputted from the tag memory 11y so that the coincidence signal Sco is not outputted from the address comparator 13y.

Next, in the clock-cycle segments 2a and 2b, the writing of data in the data memory 12x in response to the address (A) is carried out in the first bank X, while hit detection is conducted in response to the address (B) in the tag memory 11y in the second bank Y, the process of which will be described below.

The writing of data in the data memory 12x in response to the address (A) will be described first. In the clock-cycle segment 2a, the DATA (A) for the address (A) to be written is outputted from the main storage to the signal line 25 in response to the hit signal Shit which was outputted in the clock-cycle segment 1b. The DATA (A) on the signal line 25 is delayed by half the period in the data delay circuit 32, so as to be outputted to the signal line 24x. In the clock-cycle segment 2b, the write enable signal Swen is outputted so that DATA (A) is written in the data memory 12x. Since the select signal Sse was outputted in the first bank X in the clock-cycle segment 2b, the delayed data (Ai) is selected as the cache-access memory ADDac in the switching circuit 16x.

Next, hit detection in the tag memory 11y in response to the address (B) will be described. When the index section (Bi) of the address (B) is inputted in the clock-cycle segment 2a, it is outputted as the cache-access address ADDac because the select signal Sse is not outputted to the switching circuit (i.e., Sse is a logical low) so that the reference address (Bt) is outputted from the tag memory 11y to be compared with the tag section (Bt) of the address (B). If both signals coincide as a result of comparison in the second bank Y, the coincidence signal Sco is outputted so that the bank-hit signal Sbh is outputted in the clock-cycle segment 2b. In response, the hit-signal generating circuit 31 outputs the hit signal Shit. Since there was a cache hit in writing in the first state S1, a transition is made to the second state S2 in the clock-cycle segment 3a. Because the select signal Sse was outputted (i.e., Sse is a logical (high) in the first bank X in the clock-cycle segments 2a and 2b, the delayed data (Ai) is selected as the cache access address ADDac in the switching circuit 16x. Because the address comparator 13x compares the reference address (At), which is correspondingly outputted from the tag memory 11x, with the tag section (Bt) on the signal line 21, there is not a coincidence between the two, so that the coincidence signal Sco is not outputted.

Subsequently, in the clock-cycle segments 3a and 3b, the writing of data in the data memory 12y in response to the address (B) is carried out in the second bank Y, while hit detection is conducted in the tag memory 11x in response to the address (C).

The writing of data in the data memory 12y in response to the address (B) will be described first. In response to the hit signal Shit which was outputted in the clock-cycle segment 2b, the DATA (B) for the address (B) to be written is outputted from the main memory to the signal line 25 in the clock-cycle segment 3a. The DATA (B) is delayed by half the period in the data delay circuit 32, so as to be outputted to the signal line 24y. In the clock-cycle segment 3b, the write enable signal Swen is outputted, so that the DATA (B) is written.

Next, hit detection in the tag memory 11x in response to an address (C) will be described. When the index section (Ci) of the address (C) is inputted in the clock-cycle segment 3a, it is outputted as the cache-access address ADDac, so that the reference address (Ct) is outputted from the tag memory 11y to be compared with the tag section (Ct) of the address (C). If both signals coincide as a result of comparison in the first bank Y, the coincidence signal Sco is outputted so that the bank-hit signal Sbh is outputted in the clock-cycle segment 3b. In response, the hit-signal generating circuit 31 outputs the hit signal Shit. Meanwhile, access to the data memory 12X is being executed in the clock-cycle segment 3a, so as to read data from the data memory 12x in the clock-cycle segment 3b. The read DATA (C) is outputted to the signal line 24x in the clock-cycle segment 3b, based on the information of the bank-hit signal Sbh. The DATA (C) on the signal line 24x is selectively outputted in response to the signal Sren for permitting the output of the read data, latched by the first-phase clock ph1 on the signal line 25, and outputted to the signal line 25 in the clock-cycle segment 4a. Meanwhile, in the second bank Y, the index section (Bi), which has been delayed in the address delay circuit 14y in response to the select signal Sse, is selected as the cache-access address in the switching circuit 16y, so that the two sets of data being compared do not coincide, and the coincidence signal Sco and bank-hit signal Sbh are not outputted, either.

As described above, the present invention enables access to the cache memory in every cycle, provided that the writing of data in the same bank is not repeated.

Figure 4:
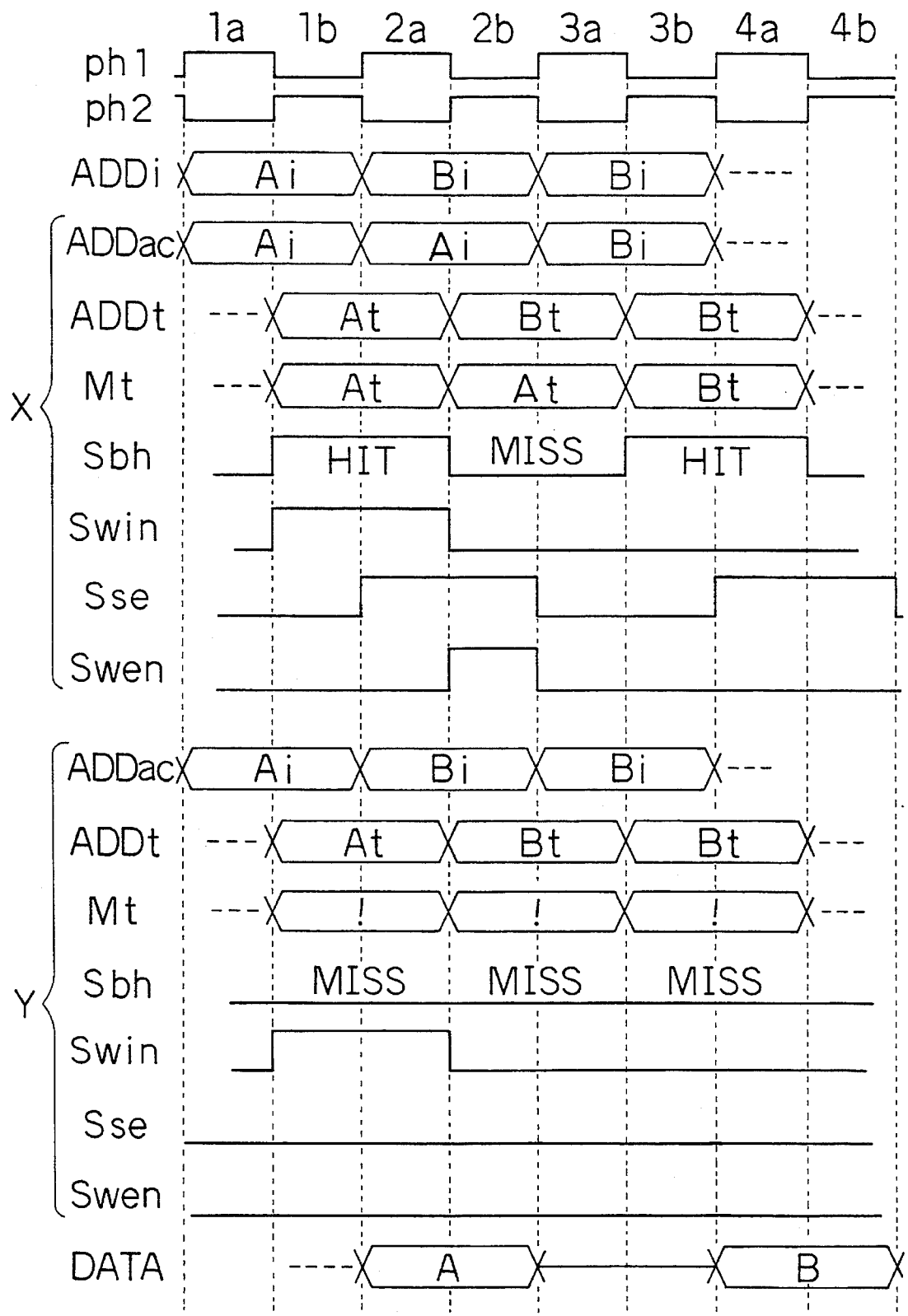
FIG. 4 is another timing chart for illustrating the operation in the first embodiment.

FIG. 4 is a view showing the operation of the major signals when a hit in writing in the first bank X is sequentially followed by a reading request, resulting in a miss in the second bank Y, and finally there is a hit in response to the same reading request in the first bank X.

First, when the index section (Ai) of the address (A) is inputted in the clock-cycle segment 1a, it is outputted as the cache-access address ADDac in the clock-cycle segment 1a. Then, the reference address (At) latched in the second-phase latch circuit L2dx and L2dy is outputted by the tag memories 11x and 11y, so as to be compared with the tag section (At) of the address (A). Here, both signals coincide as a result of comparison in the first bank X to output the coincidence signal Sco, so that the bank-hit signal Sbh is outputted in the clock-cycle segment 1b. In response to the bank-hit signal Sbh, the hit signal Shit is outputted from the hit-signal generating circuit 31. At that time, the cache memory is in the first state S1. Since there was a cache hit in writing in the first state S1, a transition is made to the second state S2 in the clock-cycle segment 2b.

Next, the writing of data in the data memory 12x in response to the address (A) is carried out in the first bank X during the clock-cycle segments 2a and 2b. Meanwhile, since the write-mode signal Swin is Low, indicating the reading mode, hit detection is conducted in response to the address (B) in the tag memory 11y in the second bank Y.

First, hit detection in the tag memory 11y in response to the address (B) will be described. When the index section (Bi) of the address (B) is inputted in the clock-cycle segment 2a, it is outputted as the cache access address ADDac. Then, the reference address Mt latched in the second-phase latched circuit L2dx and L2dy is outputted from the tag memory 11y, so as to be compared with the tag section (Bt) of the address (B). Since both signals do not coincide here as a result of comparison, for there is no corresponding data in the second bank Y of the cache memory, the coincidence signal Sco is not outputted. Hence the bank-hit signal Sbh is not outputted, either, resulting in a cache miss in the second bank Y.

Meanwhile, in the first bank X, the address (A) is written in the data memory 11x in response to the write enable signal Swen in the clock-cycle segment 2b, in the same operation as described above. However, the select signal Sse is outputted in the clock-cycle segment 2a, for the bank-hit signal Sbh was outputted in the clock cycle 1b, so that the output (Ai) of the address delay circuit 14x is selected in the switching circuit 16x as the cache access address ADDac to be outputted. Consequently, as described above, the coincidence signal Sco is not outputted in view of the results of comparison by the address comparator 13x.

Subsequently, in the clock-cycle segments 3a and 3b, processing is executed as follows. Since the transition was made to the second state S2, the index section (Bi) of the address (B) is generated again by the address-signal generating means in the clock-cycle segment 3a, to be outputted as the cache-access address ADDac in the clock-cycle segment 3b, which is then outputted as the reference address Mt from the tag memory 11x, so as to be compared with the tag section (Bt) of the address (B). If both signals coincide as a result of comparison in the first bank X, the coincidence signal Sco is outputted so that the bank-hit signal Sbh is outputted in the clock-cycle segment 3b. Meanwhile, access to the data memory 12x is executed in the clock-cycle segment 3a, so that the reading of data from the data memory 12X is carried out in the clock-cycle segment 3a. The read DATA (B) is outputted, based on the information of the bank-hit signal Sbh, to the signal line 24x in the clock-cycle segment 3b. The DATA (B) on the signal line 24x is selectively outputted in response to the signal Sren for permitting the output of the read data and then latched by the first-phase clock ph1 in the first-phase latch circuit L1d, so as to be outputted to the signal line 25 in the clock-cycle segment 3b. That is, the transition was made to the first state S1 in the clock-cycle segment 3b, since there was a cache miss in reading in the second state S2.

The miss that occurred in the clock-cycle segment 2b is based on the results of comparison between the reference address (Mt), which was read from the tag memory 11y in the second bank Y, and the tag section (Bt) of the address (B), so that it is a miss in the second bank Y and not a miss in the whole cache memory. Although the present invention involves the occurrence of such a bank miss as mentioned above, for it allows the writing of data which may cause hits in the different banks X and Y, the provision of the second state S2 which indicates that data is being written in either of the banks allows a transition from the second state S2 to the first state S1 when a bank miss occurs in the second state S2, so that the presence or absence of a cache hit can be determined in terms of the whole cache.

As described above, the present invention enables access to a cache with equal penalty to that of the prior art embodiment even when the reading from and writing in the same bank is successively carried out.

Although the two banks are used in the present embodiment, it is easily understood that similar effects can be obtained when the number of banks is 2 or more.

EXAMPLE 2

Figure 5:
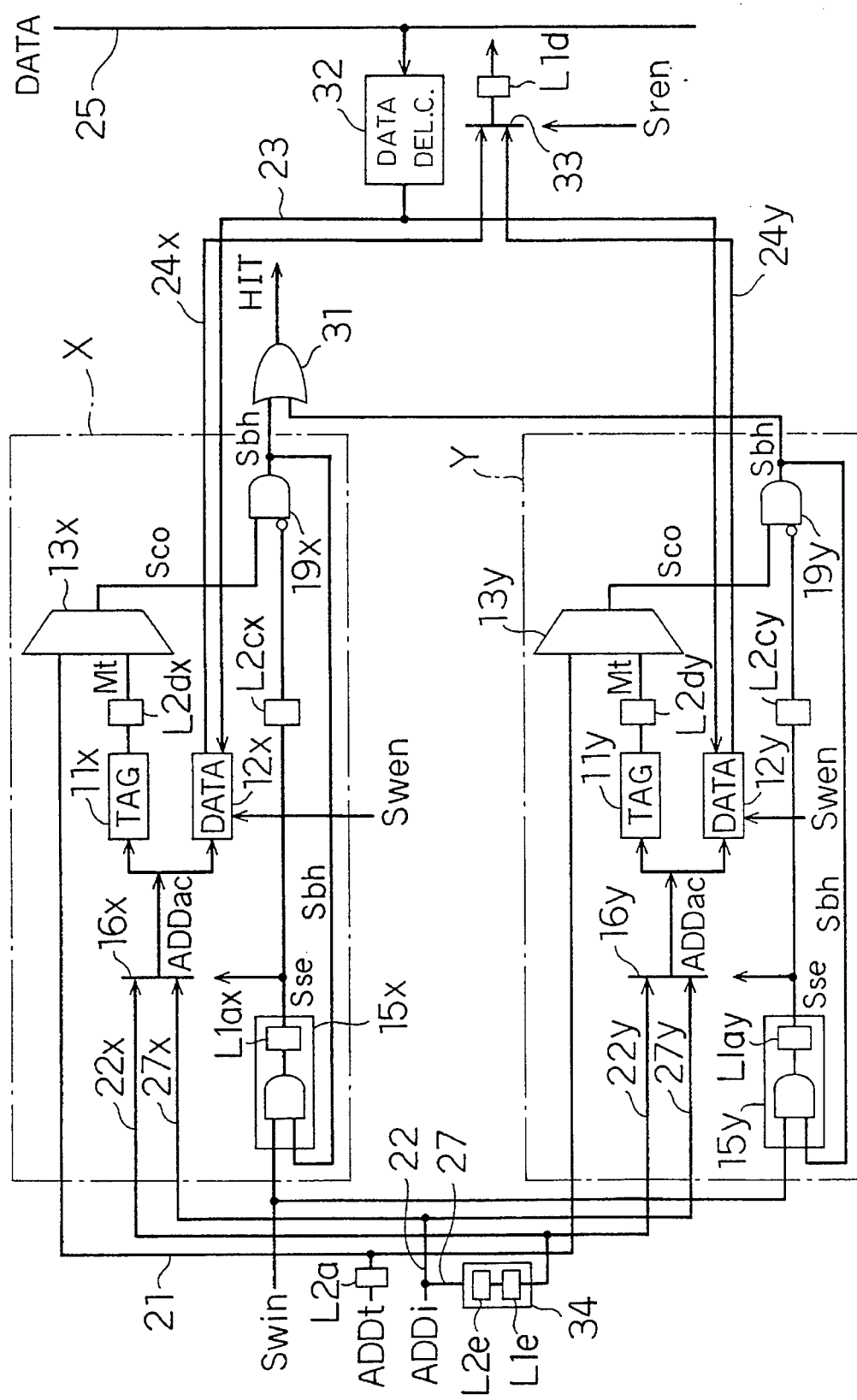
FIG. 5 is an electric circuit diagram of the control circuit for a cache memory in the second embodiment.
Figure 6:
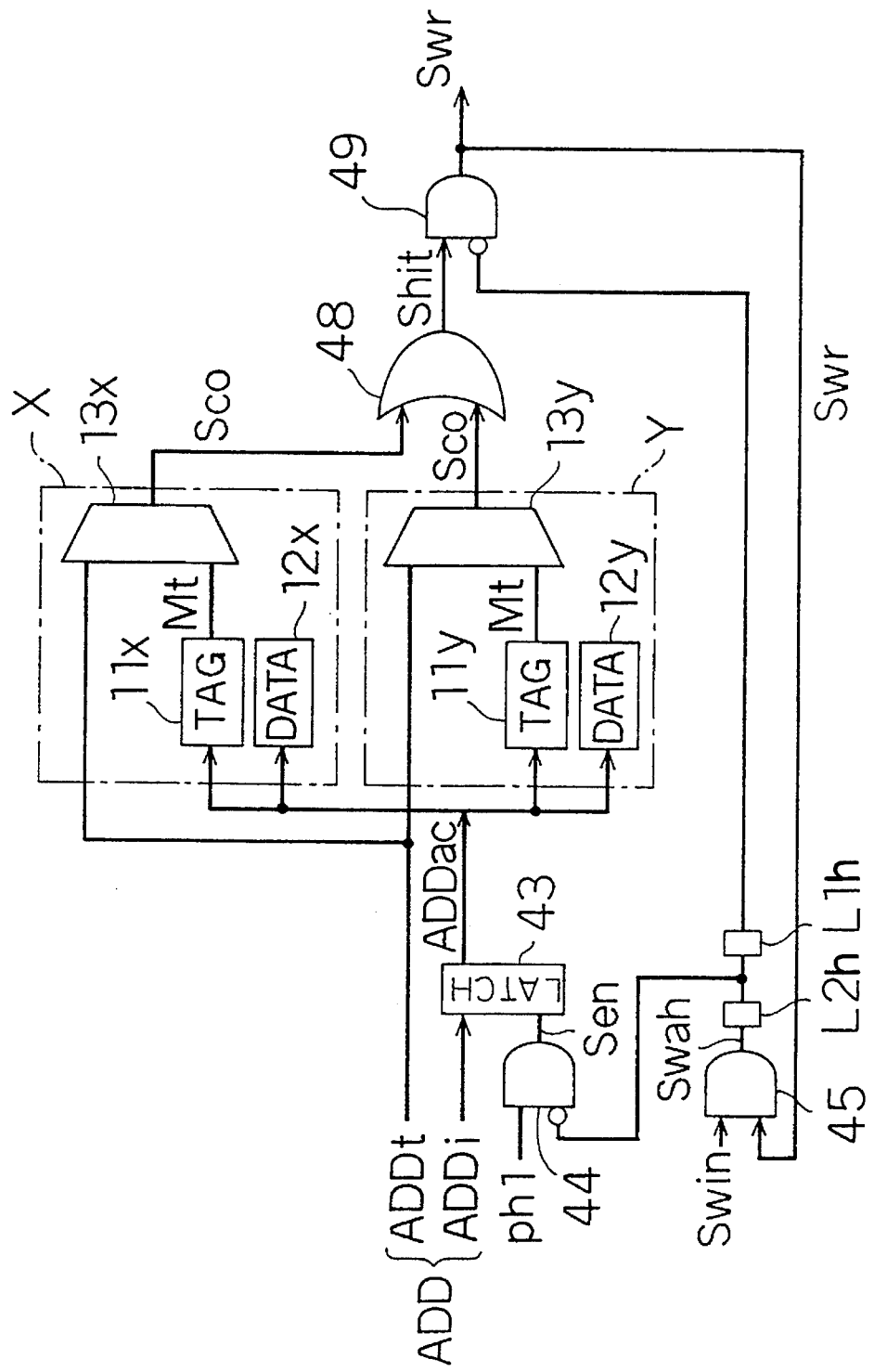
FIG. 6 is a conventional electric circuit diagram of the control circuit for controlling a cache memory.

A second embodiment will be described below. FIG. 5 shows the structure of the control circuit for a cache memory in the second embodiment. Here, the same reference numerals as shown in FIG. 1 denote the same elements, so that elements denoted by different numerals will solely be described.

As shown in FIG. 5, the present embodiment is constituted so that the address delay circuits 14x and 14y, which are respectively provided in banks X and Y in the first embodiment, are formed as a single address delay circuit 34 including latch circuits L1e and L2e to be commonly used by the banks. In the present embodiment, the signal line 22 for inputting the index section is branched before it reaches the banks X and Y, so as to provide the branch line 27 for inputting the index section outside of the banks X and Y. The branch line 27 is intervened by the address delay circuit 34. The inputs of the switching circuits 16x and 16y are connected to the signal lines 22x and 22y for inputting the index section and to the branch lines 27x and 27y thereof. The signal which has not been delayed is inputted through the signal lines 22x and 22y while the signal which has been delayed by one period is inputted through the branch lines 27x and 27y, so that one of the delayed and not delayed signals is selected in the switching circuits 16x and 16y to be outputted as the cache- access address ADDac. The operation of the control circuit in the present embodiment is the same as in the first embodiment described above.

With the structure shown in FIG. 5, the address delay circuits 14x and 14y, which were provided in each of the banks in FIG. 1, are satisfactorily replaced by a single circuit, so that a smaller control circuit for a cache memory of the size of a transistor can be fabricated.

We claim:

1. A control circuit for controlling a cache memory which is separated from a main memory and which is divided into a plurality of banks, each bank having a tag memory and a data memory and said tag memory being constituted so as to output a reference address in response to an access signal, said circuit for controlling a cache memory comprising:

a means for inputting an address signal comprising an index section and tag section in each of said banks via a first signal line for inputting the tag section and a second signal line for inputting the index section;

a branch line for inputting the index section which is branched from said signal line for inputting the index section;

an address delay means intervening in said branch line for inputting the index section so as to delay the output of the index section of the address signal;

a signal switching means included in each of said banks, each of said switching means having the output connected to said tag memory and data memory of the associated bank and the input connected to the output of said second signal line for inputting the index section and to the output of the address delay means intervening in the branch line for inputting the index section, said signal switching means being constituted so as to switch output data between data which is inputted via the second signal line for inputting the index section and delayed data which is inputted via the branch line for inputting the index section;

an address comparing means which is included in each of said banks and which has the input terminal connected to said first signal line for inputting the tag portion and to the output signal line of said tag memory of the associated bank, so as to compare the tag section of said address signal with the reference address output from said tag memory of the associated bank and to output an coincidence signal when there is a coincidence between the two;

a writing-operation control means which fetches, when the coincidence signal is outputted from one of said banks, a memory corresponding to said address from the main memory and controls the writing of data in the data memory of the bank in which said coincidence signal was outputted; and a means for selectively controlling operations which controls said switching means so that, when the coincidence signal is outputted from said address comparing means in view of the results of comparison which was made by the address comparing means for writing, the delayed data of the index section of the address signal is selected as the access signal for the next comparison to be outputted to said memory tag.

2. A control circuit for controlling a cache memory according to claim 1, further comprising:

a select-signal generating means for generating a select signal for the next comparing operation; and a bank-hit signal generating means for generating a bank-hit signal generated by said select-signal generating means in response to said coincidence signal when said select signal is not outputted, said bank-hit signal generating means having the input connected to the output of said means for comparing the address signal and to the output of said select-signal generating means, wherein:

the input of said select-signal generating means is connected to the output of said bank-hit signal generating means so that the select signal is outputted in response to the bank-hit-signal; and said means for selectively controlling operations controls the signal switching means so that, in response to the select signal from said select-signal generating means, the delayed data of the index section of the input address signal is selected.

3. A control circuit for controlling a cache memory according to claims 1 or 2, wherein said address delay means includes a single delay circuit which delays the index section of the address signal with a timing common to each of the banks.

4. A control circuit for controlling a cache memory according to claim 2, further comprising:

a reading-operation control means which instructs the reading of data from a data memory of a given bank when there is a corresponding address in response to the access signal; and an operation-mode switching means which has an output for switching between a write mode in which the writing-operation control means operates and a read mode in which the reading-operation control means operates, said output being connected to the input of said select-signal generating means, wherein said select-signal generating means is constituted so as to generate the select signal with high level when the bank-hit signal generated a half a cycle before is high level and the cache memory is in the write mode.

5. A control circuit for controlling a cache memory according to claim 2, wherein:

the means for inputting the address signal is constituted so as to synchronize the index section of the address signal with a first-phase clock which periodically repeats a cycle of Hi and Low while synchronizing the tag section of the address signal with a second-phase clock which has the same period as the first-phase clock but which repeats the cycle of Hi and Low by half the period behind the cycle of the first-phase clock; and a second-phase synchronizing means is included for synchronizing the reference address signal, which is outputted from a tag memory of a given bank to the address comparing means, with said second-phase clock.

6. A control circuit for controlling a cache memory according to claim 5, wherein said means for selectively controlling operations includes a first-phase synchronizing means for synchronizing the output of said delay means and the output of said bank-hit signal with said first-phase clock.

7. A control circuit for controlling a cache memory according to claims 1 or 2, wherein the means for inputting the address signal is constituted so as to input the present tag address as a tag address of the next cycle when the coincidence signal is in low level in either of the banks while there is a bank in which the writing of data is being carried out by the writing-operation control means.

* * * * *

UNITED STATES PATENT AND TRADEMARK OFFICE
CERTIFICATE OF CORRECTION

PATENT NO. : 5,497,473
DATED : March 5, 1996
INVENTOR(S) : Miyoshi et al.

Page 1 of 2

It is certified that error appears in the above-identified patent and that said Letters Patent is hereby corrected as shown below:

On the cover page:

In the Abstract, line 12, change "generated", second occurance, to --outputted--; and line 13, change "generated" to --generates--.

In the Specification:

Column 1, line 60, change "nega- tive-phase" to --negative-phase--.

Column 2, line 66, delete "of"; and
line 67, before "the address" insert --of--.

Column 6, line 40, after "when" insert --the--.

Column 8, line 14, change "L2dx" to --L2dy--.

UNITED STATES PATENT AND TRADEMARK OFFICE
CERTIFICATE OF CORRECTION

PATENT NO. : 5,497,473
DATED : March 5, 1996
INVENTOR(S) : Miyoshi et al.

It is certified that error appears in the above-identified patent and that said Letters Patent is hereby corrected as shown below:

In the claims:

Column 11, Claim 1, line 12, after "said" insert --second--; and

Column 12, line 19, after "and" insert --said--.

Signed and Sealed this

Thirteenth Day of June, 2000

*Attest:*

Q. TODD DICKINSON

*Attesting Officer*     Director of Patents and Trademarks